(12) United States Patent
Shirokoshi

(10) Patent No.: US 7,156,479 B2
(45) Date of Patent: Jan. 2, 2007

(54) IMAGE FORMING APPARATUS TO WHICH ATTACHMENT UNIT CAN BE CONNECTED

(75) Inventor: Junji Shirokoshi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 286 days.

(21) Appl. No.: 10/702,082

(22) Filed: Nov. 6, 2003

(65) Prior Publication Data

US 2004/0146294 A1    Jul. 29, 2004

(30) Foreign Application Priority Data

Nov. 22, 2002    (JP) ............................. 2002-339764

(51) Int. Cl.
*B41J 29/38*    (2006.01)
(52) U.S. Cl. ............................ 347/5; 347/16
(58) Field of Classification Search .................. 347/16, 347/5
See application file for complete search history.

(56) References Cited

U.S. PATENT DOCUMENTS

| | | | | |
|---|---|---|---|---|
| 4,366,489 A | * | 12/1982 | Yamaguchi | ................. 347/182 |
| 4,720,798 A | * | 1/1988 | Reed et al. | .................... 716/19 |
| 5,148,595 A | * | 9/1992 | Doggett et al. | ............... 29/840 |
| 5,357,268 A | * | 10/1994 | Kishida et al. | ................ 347/13 |
| 5,358,238 A | * | 10/1994 | Mandel et al. | ............... 271/298 |
| 5,405,128 A | * | 4/1995 | Fujiwara et al. | ............ 271/9.13 |
| 5,431,704 A | * | 7/1995 | Tamamaki et al. | ............. 51/309 |
| 5,704,609 A | * | 1/1998 | Mandel et al. | ............... 271/290 |
| 5,975,515 A | * | 11/1999 | Capri et al. | ................. 271/9.11 |
| 6,297,842 B1 | * | 10/2001 | Koizumi et al. | ............. 347/237 |
| 6,585,339 B1 | * | 7/2003 | Schloeman et al. | ........... 347/12 |
| 6,715,422 B1 | * | 4/2004 | Nishida | ....................... 101/477 |
| 6,758,541 B1 | * | 7/2004 | Hashimoto | ...................... 347/5 |
| 6,758,545 B1 | * | 7/2004 | Ikeda et al. | .................... 347/16 |

FOREIGN PATENT DOCUMENTS

JP    2001-106352    4/2001

* cited by examiner

*Primary Examiner*—Vip Patel
*Assistant Examiner*—Shelby Fidler
(74) *Attorney, Agent, or Firm*—Sughrue Mion, PLLC

(57) ABSTRACT

A plurality of sheet feed units 11, 12, . . . have the same circuit structure with each other. One ends of sensors 113 through 116 which detect whether there is a sheet and the size of the sheet are connected in parallel with sensors which are disposed to other units via communication lines, and also with input ports of a CPU 101 of a main printer section 10. On the other hand, the other ends of the sensors are connected with a transistor 103*a* which is disposed to the main printer section 10. For instance, as the CPU 101 switches a port SELL to the H level, the transistor 103*a* turns on and voltages at the input ports of the CPU 101 change in accordance with the states of the sensors 113 through 116, i.e., the state of sheet feed unit 11.

6 Claims, 6 Drawing Sheets

IMAGE FORMING APPARATUS TO WHICH ATTACHMENT UNIT CAN BE CONNECTED

BACKGROUND OF THE INVENTION

1. Field of the Invention

The present invention relates to an image forming apparatus which is used as it is with one or a plurality of attachment units attached as needed.

2. Description of the Related Art

An image forming apparatus is already available which is used with one or a plurality of attachment units, such as multiple of sheet feed units or finisher units, attached in accordance with specifications or as desired by a user. Such an attachment unit usually comprises controlled elements such as various types of sensors which detect an operating state of the attachment unit and actuators which drive movable portions. Hence, it is necessary to lay communications lines which control these controlled elements between a main section of apparatus and the respective attachment units.

In the event that a plurality of attachment units are attached, it is necessary to control these units individually. While a solution may be to connect the plurality of attachment units respectively with the main section of apparatus by individual communications lines, this solution requires many communications lines and is costly. Hence, a general alternative is to connect the attachment units to each other in a cascade arrangement. Meanwhile, for further reduction of the number of the communications lines, a conventional apparatus and a conventional communications method also have been proposed which require to connect the respective attachment units and the main section of apparatus by a common bus line to thereby realize transmission of various types of data with time-division system in a serial communication. This type of apparatus is the apparatus described in Japanese Patent Application Laid-Open Gazette No. 2001-106352 for instance. According to this type of technique, a communications module and decode/encode means such as a serial/parallel convertor are disposed to each attachment unit and serial data transmitted on a communications line is converted into a control signal which is for controlling each sensor, etc.

Such a conventional technique is effective particularly in a circumstance that there are many units are attached, since the number of communications lines does not increase even when a large number of units are used. However, a communications module and the like to be disposed to each unit demand relatively expensive components, and hence, there arises a problem that an apparatus cost also increases. In addition, since many pieces of data are transmitted in a time-division serial transmission, the process lacks the speed and is not very much resistant against a noise which gets mixed in the communications lines.

As a demand for a higher speed in the process has rose over the recent years, a communications technique is desired which makes it possible to stably control a plurality of attachment units at a high speed and to structure the attachment units at a low cost.

SUMMARY OF THE INVENTION

A primary object of the present invention is to provide an image forming apparatus which makes it possible to stably control a plurality of attachment units at a high speed and to structure the attachment units at a low cost.

To achieve the object, in an image forming apparatus according to the present invention, signal lines and selective lines are disposed. The signal lines connect respective controlled elements which are disposed to each one of a plurality of attachment units and a main section of apparatus each other so as to realize communications between the respective attachment units and the main section. The selective control lines connect the main section and the respective attachment units so as to select some of the attachment units with which the main section is to communicate. And the main section and the respective attachment units are connected by a line group which contains these signal lines and selective control lines.

In this image forming apparatus, owing to such a structure, the controlled elements disposed to each attachment unit share the signal lines and are multiplexed. Hence, it is possible to greatly reduce the number of the communications lines than where the respective attachment units and the main section are connected individually. Meanwhile, the selective control lines for selecting the attachment unit which is to communicate with are disposed one each for each attachment unit, and therefore, it is possible to control the units separately without fail. Further, since it is possible to select the attachment units merely by operating the corresponding selective control lines, a higher-speed communication is possible than the conventional apparatus with time-division system.

As herein described, "upstream" refers to the closer side to the main section in the order of connecting the plurality of attachment units which are connected in a cascade arrangement. On the contrary, "downstream" refers to the farther side from the main section.

Further, a "cascade connection count" is the maximum number of the units which can be controlled separately from the main section. Hence, for instance, even in an apparatus which permits to mechanically connect any desired number of attachment units having the identical structure in a cascade arrangement, when there is a limitation upon the number of the units which can be actually controlled because of a restriction of the capability of the main section, the number of the units which can be actually controlled is a "cascade connection count."

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
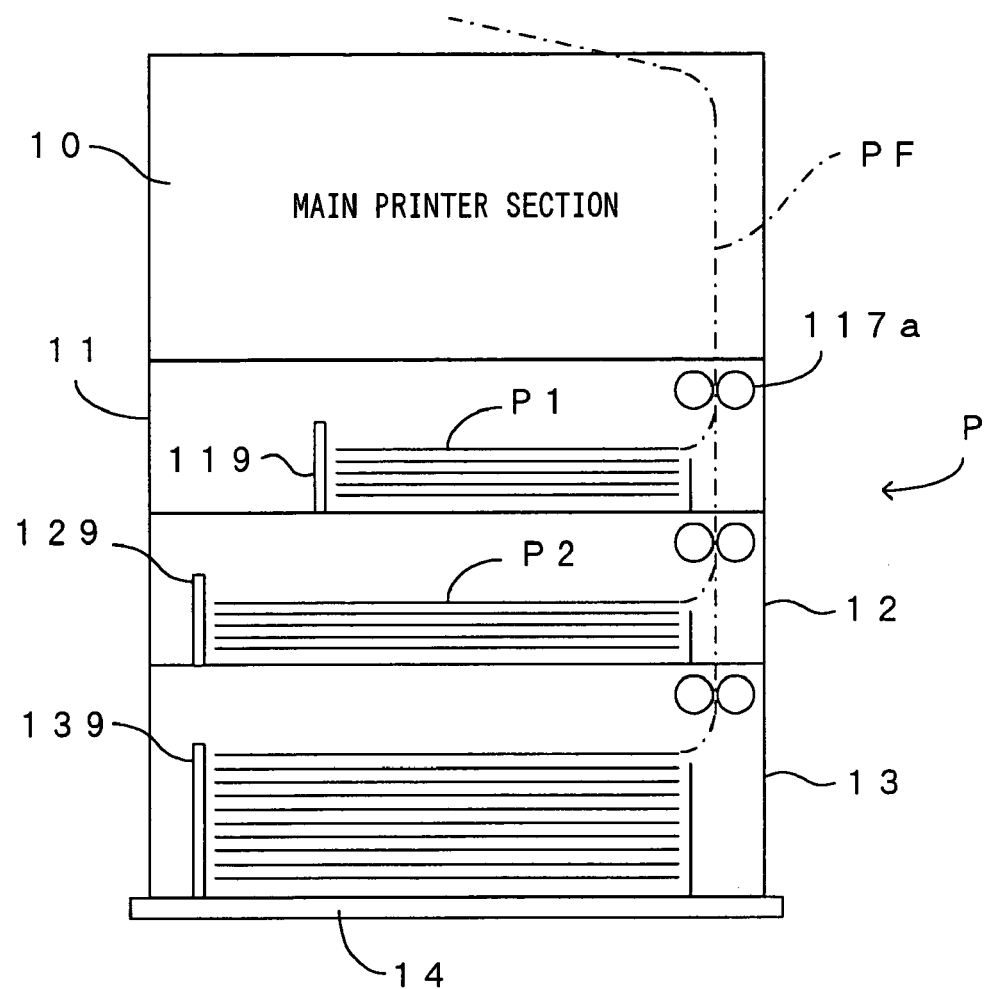
FIG. 1 is an appearance view of a preferred embodiment of an image forming apparatus according to the present invention.

FIG. 1 is an appearance view of a preferred embodiment of an image forming apparatus according to the present invention. This image forming apparatus P is an apparatus which executes an image forming operation in response to a print instruction received from an external apparatus such as a host computer and forms an image on a sheet. In the image forming apparatus P, a plurality of sheet feed units 11, 12 and 13 are attached, as they are stacked one atop the other, between a main printer section 10 which executes the image forming operation and a base portion 14, as shown in FIG. 1. In this embodiment, the main printer section 10 corresponds to a "main section" of the present invention, while the sheet feed units 11, 12 and 13 correspond to "attachment units" of the present invention.

The sheet feed units 11 and 12 have the same structure, but respectively house sheets P1 and P2 which are different in size from each other and function as sheet feed units which supply sheets of the respective sizes to the main printer section 10 as needed. The sheet feed unit 13, although having a similar function to that of the two sheet feed units 11 and 12 mentioned above in that the sheet feed unit supplies sheets to the main printer section 10, is different in terms of structure from the sheet feed units 11 and 12. That is, the sheet feed unit 13 is a large-capacity sheet feed unit whose sheet housing capacity is larger than those of the other sheet feed units 11 and 12. Sheet guides 119, 129 and 139 are disposed for free slide movements respectively to the sheet feed units 11, 12 and 13. When a user sets the sheet guide at a position corresponding to the sheet size during setting of a sheet, a corresponding one of sheet size detection sensors described later turns on.

Maximum of three sheet feed units can be attached to the main printer section 10 in the image forming apparatus P. In other words, the cascade connection count is 3 in this embodiment. Further, by means of various schemes described later, it is possible to freely set the number within 3 of the sheet feed units to attach and the order in which the sheet feed units are attached. Besides the combination described above, diverse systems can be provided in accordance with the specifications of the apparatus or a user's wish by attaching one sheet feed unit or two sheet feed units, changing the order of the sheet feed units, or using the three sheet feed units all of the same type for example. In the following, the sheet feed units will be referred to as the unit 1, the unit 2 and the unit 3, starting with the closest one to the main printer section 10, i.e., the upstream side sheet feed unit in the order of connecting the sheet feed units unless it is necessary to particularly distinguish the sheet feed units from each other. As a specific example, however, the following will assume that the sheet feed units 11, 12 and 13 are attached in this order as described above.

An image forming operation in the main printer section 10 is similar to a known operation in this type of image forming apparatus, and will not be described. However, the image forming apparatus P, when an image is to be formed in accordance with a print instruction received from an external apparatus, a sheet of an appropriate size considering the size of an image to be formed or a size specified in the print instruction is selected and an image is formed on the sheet. That is, the main printer section 10 grasps whether there are sheets in the units 1, 2 and 3 and the sizes of the sheets. As a print instruction is fed from an external apparatus, the main printer section 10 selects one of the sheet feed units in which sheets that are appropriate size have been set. For instance, when the sheet feed unit 11 to which sheets P1 have been set is selected, a sheet feed roller 117a of thus selected sheet feed unit 11 is driven, and one sheet P1 is ejected out from the sheet feed unit 11 and transported into the main printer section 10 along a sheet transportation path PF. Inside the main printer section 10, a predetermined image is transferred onto the sheet P1, and the sheet P1 now seating the transferred image is discharged to a discharge tray (not shown) which is disposed in an upper section of the apparatus.

Figure 2:
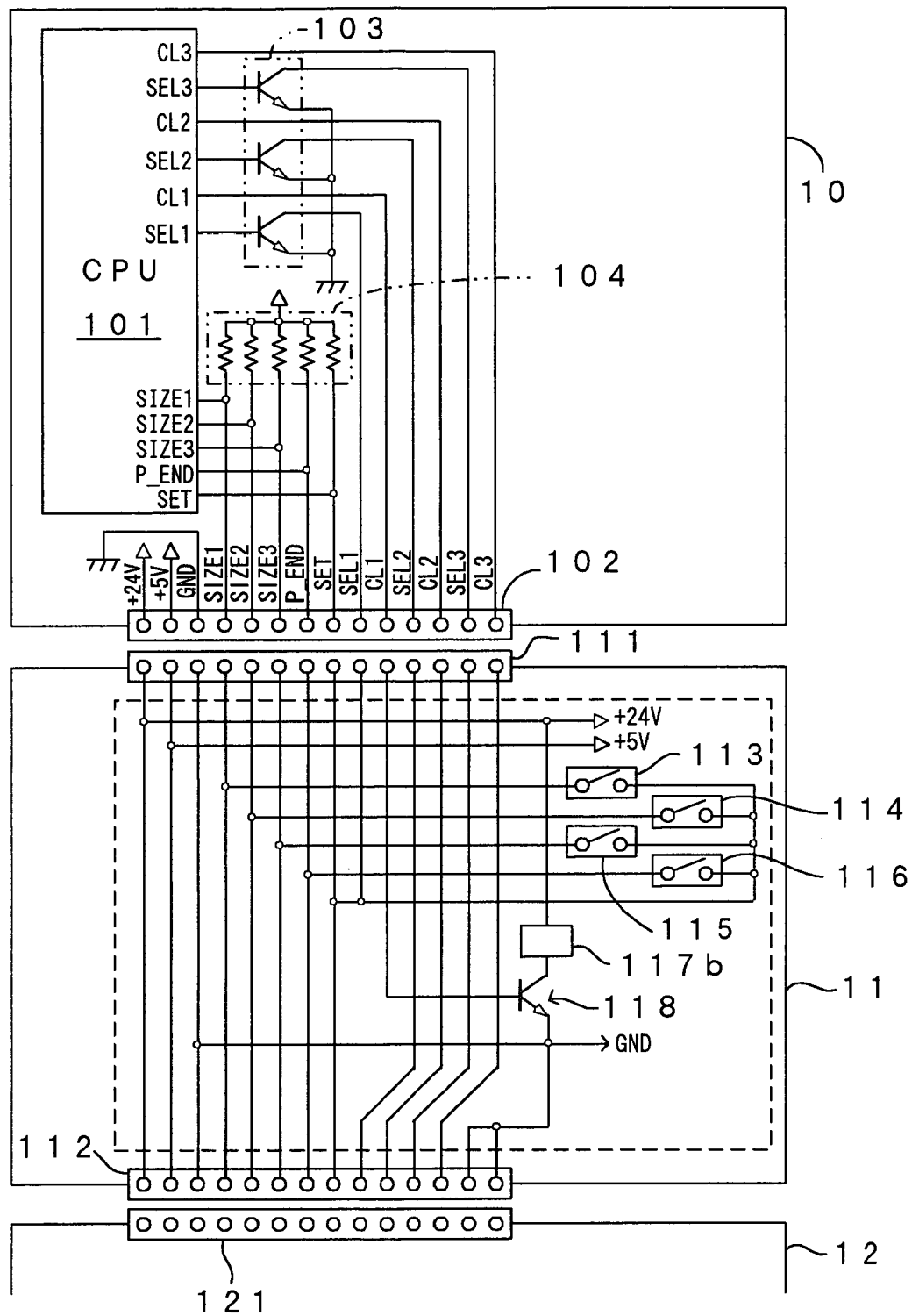
FIG. 2 is a drawing of a control circuit for a main section of apparatus and each sheet feed unit.

FIG. 2 is a drawing of a control circuit for the main printer section and the respective sheet feed units. Connectors disposed to a bottom section of the main printer section 10 and a top and a bottom sections of the respective sheet feed units engage with each other, with the main printer section 10 and the respective sheet feed units 11, . . . stacked one atop the other. To be more specific, as shown in FIG. 2, a connector 102 is disposed to the bottom section of the main printer section 10, while a connector 111 is disposed to the top section of the sheet feed unit 11, and these connectors engage with each other. A connector 112 is disposed to the bottom section of the sheet feed unit 11, while a connector 121 is disposed to the top section of the sheet feed unit 12, and these connectors engage with each other.

The connectors disposed to the bottom sections of respective units, that is, the connector 102 disposed to the main printer section 10, the connector 112 disposed to the sheet feed unit 11 and the like, have the same structure. The connectors disposed to the top sections of the respective units, that is, the connector 111 disposed to the unit 11 and the like, have the same structure. In addition, connectors having the same structure as the connector 112 are disposed to the bottom sections of the sheet feed units 12 and 13 and a connector having the same structure as the connector 111 is disposed to the top section of the sheet feed unit 13. This structure allows to attach mechanically any desired sheet feed units in any desired order to the main printer section 10 in this image forming apparatus P.

With the main printer section 10 and the respective sheet feed units 11 and the like connected via the connectors in this fashion, a cascade connection of the main printer section 10 and the respective sheet feed units 11 and the like is realized by means of the connection lines. In this embodiment, the connector 102 disposed to the bottom section of the main printer section 10 corresponds to a "main-section connector" of the present invention. The connectors 111, 121 and the like disposed to the top sections of the respective sheet feed units correspond to "upstream-side connectors" of the present invention, while the connectors 112 and the like disposed to the bottom sections of the respective sheet feed units correspond to "downstream-side connectors" of the present invention.

As shown in FIG. 2, the main printer section 10 comprises a CPU 101 which governs communications with the respective sheet feed units. Ports of the CPU 101 are electrically connected to the connector 102 directly or via buffers by the respective communications lines which form a connection line. In the following, the respective ports of the CPU 101 and the corresponding communications lines will be referred to by the same names unless it is necessary to particularly distinguish the respective ports from the corresponding communications lines.

Of the respective ports of the CPU 101, SIZE1 through SIZE3, P_END and SET are input ports to which pull-up resistors provided as a resistor array 104 are disposed. As described later, the communications lines connected to the respective ports function as "signal lines" of the present invention which receive sensor outputs from the respective sheet feed units 11, etc.

The ports of SEL1, SEL2 and SEL3 are output ports for selecting the units 1, 2 and 3, respectively, as units to communicate with. An open collector buffer provided as a transistor array 103 is connected with each port. When one of these ports is switched to the H level, the transistor connected with this port turns on, thereby making it possible to suck in an output current from each sensor which will be described later. On the contrary, when these ports stay at the L level, the transistors are cut off and no current flows. The respective communications lines SEL1, SEL2 and SEL3 function as "selective control lines" of the present invention which select the sheet feed unit to communicate with by establishing or blocking current paths between the main printer section 10 and the sheet feed units which correspond to the communications lines.

Ports of CL1, CL2 and CL3 are output ports for controlling electromagnetic clutches of the respective sheet feed units which will be described later. In short, the communications lines CL1 through CL3 are clutch control lines which control the electromagnetic clutches of the respective units 1 through 3. In addition to those described above, further disposed to the connector 102 are terminals for supplying a power source voltage to other units, namely, a +24V terminal, a +5V terminal and a ground (GND) terminal.

Meanwhile, the sheet feed unit 11 comprises three sheet size detection sensors 113 through 115 which are disposed at different positions and a sheet existence detection sensor 116, as shown in FIG. 2. Hence, based on sensor outputs from these sensors which serve as "controlled elements" of the present invention, the CPU 101 can judge whether there is a sheet in the sheet feed unit 11 and the size of the sheet. While these sensors 113 through 116 are micro switches which turn on and off depending on whether there is mechanical pressing force, optical means such as photo-interrupters for instance may be used to detect whether there is a sheet and the size of the sheet. One ends of these sensors 113 through 116 are connected with the signal lines SIZE1 through SIZE3 and P_END respectively, while the other ends of these sensors 113 through 116 and the signal line SET are connected with the selective control line SEL1.

The sheet feed unit 11 further comprises an electromagnetic clutch 117b which drives a sheet feed roller 117a (FIG. 1) and a driver transistor 118 which controls turning on and off of the electromagnetic clutch 117b. As the driver transistor 118 turns on and off in response to a control signal from the main printer section 10, the sheet feed roller 117a is driven. That is, a base electrode of the driver transistor 118 is connected with the communications line CL1, and the electromagnetic clutch 117b is connected between a +24V power source supplied from the main printer section 10 and a collector electrode of the driver transistor 118. When the H level is outputted to the output port CL1 of the CPU 101 of the main printer section 10 and thereby the communications line CL1 rises to the H level, the driver transistor 118 turns on, the electromagnetic clutch 117b carries a current, and the sheet feed roller 117a is driven. On the contrary, when the communications line CL1 is at the L level, the driver transistor 118 is cut off and the electromagnetic clutch 117b carries no current.

Of the communications lines which are connected with the main printer section 10 via the connector 111, the four communications lines SEL2, CL2, SEL3 and CL3 are not used inside the sheet feed unit 11 but are connected directly with the connector 112. That is, the sheet feed unit 11 merely relays these communications lines.

Further, contacts corresponding to these communications lines are not arranged identically between the two connectors 111 and 112. The arrangement of these communications lines in the connector 112 is the same as that in the connector 111 as it is shifted two contact positions toward the left-hand side. Assuming that the positions of the contacts in the two connectors 111 and 112 and the like are referred to as the first pin, the second pin, . . . , the fourteenth pin in sequence from the left-most pin shown in FIG. 2 in each connector. The communications lines SEL2, CL2, SEL3 and CL3 are located at the eleventh pin through the fourteenth pin in the upstream-side connector 111, whereas in the downstream-side connector 112, the communications lines are assigned to the ninth through the twelfth pins but the thirteenth and the fourteenth pins are grounded.

Such arrangements realize the following effect. Of the respective units which are connected in a cascade arrangement, as viewed from the unit 1 which is connected on the upstream-most side, the corresponding selective control line SEL1 and the corresponding clutch control line CL1 are connected with the ninth pin and the tenth pin, respectively, of the corresponding upstream-side connector. Meanwhile, as viewed from the unit 2 which is connected on the downstream side to the unit 1, the corresponding selective control line SEL2 and the corresponding clutch control line CL2 are connected with the ninth pin and the tenth pin, respectively, of the corresponding upstream-side connector. This is the same in the unit 3, too.

Hence, in each unit, the ninth pin of the corresponding upstream-side connector is the contact position to which the corresponding selective control line is assigned and the tenth pin of the corresponding upstream-side connector is the contact position to which the corresponding clutch control line is assigned. It then follows that each unit may be structured in such a manner that each unit will operate in accordance with signals which are fed at the ninth pin and the tenth pin of the corresponding upstream-side connector. In short, with the internal wirings between the upstream-side connector and the downstream-side connector of each unit provided as described above, the same circuit structure can be used in the respective units. However the order of attaching the units is changed, this holds truth. Hence, the three units may be electrically interchanged with each other.

As viewed from the main printer section 10, the selective control line SEL1 and the clutch control line CL1 are connected with the unit 1, the selective control line SEL2 and the clutch control line CL2 are connected with the unit 2 and the selective control line SEL3 and the clutch control line CL3 are connected with the unit 3. Hence, with these control lines operated, the units 1 through 3 can be controlled independently of each other without fail.

Conventional control utilizing a serial communication requires to add an ID (identification information) to each unit so as to distinguish the unit from the other units. Hence, when a plurality of units having the same structure are to be attached, it is necessary to utilize some means which permits to distinguish from the other units, by for example storing IDs in memories of the respective units in advance, or by setting up dip switches and the like differently between the different units for instance.

In addition, during a communication, the master (which corresponds to the main printer section 10 in the preferred embodiment above) must first send an ID code as serial data to thereby designate a unit to which the communication is to be made. The slave (which corresponds to each one of the sheet feed units 11 and the like in the preferred embodiment above) on the other hand must receive and decode serial data which corresponds to the ID code, and must determine to send and receive necessary data when the ID code corresponds to the slave's own ID but to ignore the ID code when the ID code corresponds to the ID of other unit. Each unit thus needs to seat a communications device and is therefore costly. Further, since receipt and processing of serial data requires time, it is difficult to realize a high-speed communication.

In contrast, according to the preferred embodiment described above, the unit to which a communication is to be made is selected by means of the selective control line which is disposed for each one of the plurality of the units, it is not necessary to set such an ID to each unit. There is no need for each unit to comprise means which sets an ID to the unit, a communications device and the like, and in addition, the respective units can have the common circuit structure, thereby remarkably reducing an apparatus cost. Further, it is possible to instantly specify the unit by changing the level at the corresponding selective control line, which is advantageous in terms of operation speed, too.

Meanwhile, of the communications lines which are connected with the upstream-side connector of the sheet feed unit 11, the eight communications lines starting at the left-most one in FIG. 2, namely, the communications lines which are connected with the first through the eighth pins (+24V through SET) are connected with internal circuits such as the sensors of the unit 11 described above and also respectively with the first through the eighth pins of the connector 112. Hence, with the plurality of the sheet feed units attached, as viewed from the main printer section 10, the sensors which are controlled elements disposed respectively to each sheet feed unit are in a parallel connection with each other.

Figure 3:
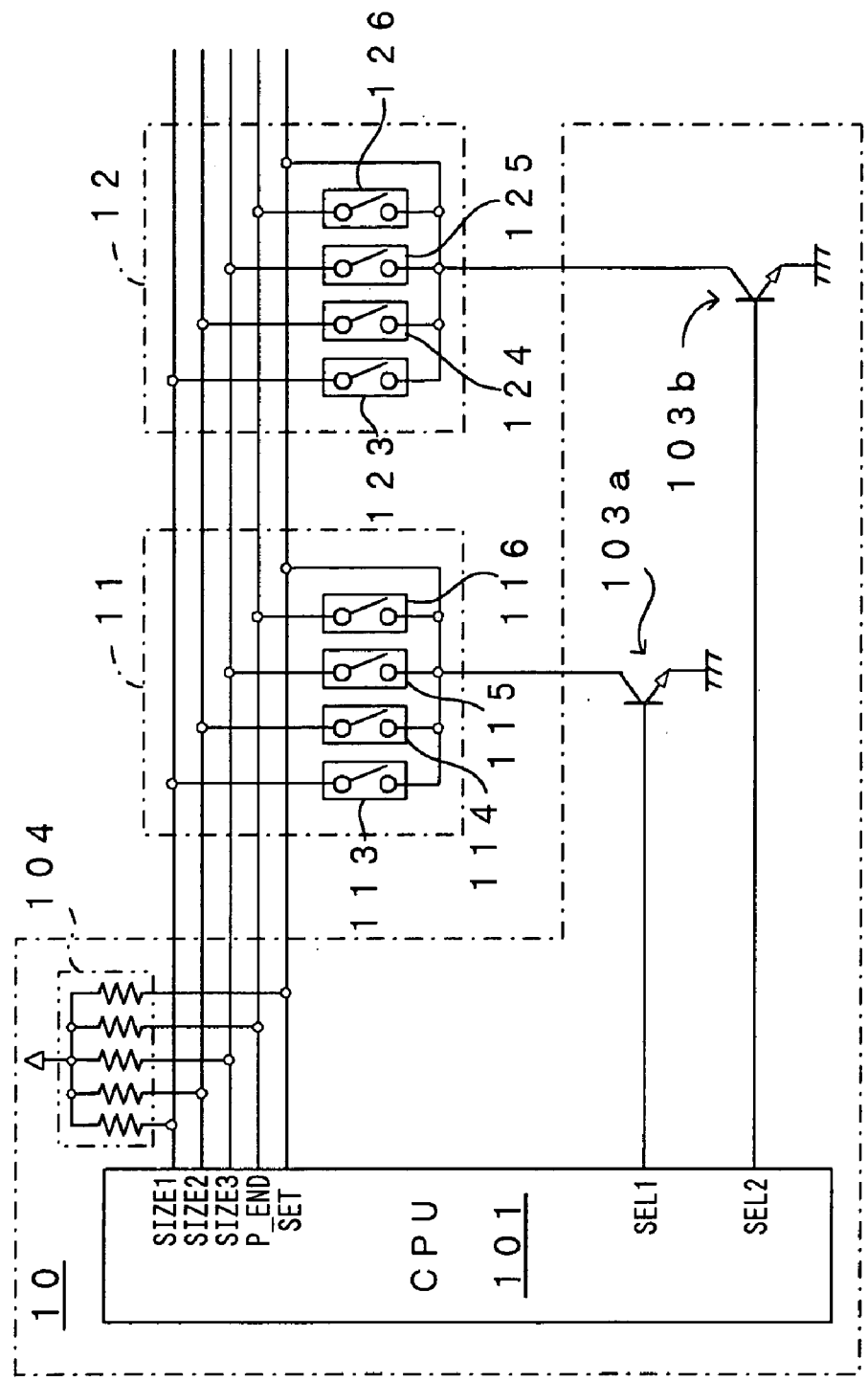
FIG. 3 is a drawing which shows connection between the main section and a sensor of each sheet feed unit.

FIG. 3 is a drawing which shows connections between the main printer section and the respective sensors of each sheet feed unit. As for portions relevant to the sheet feed unit 13, these portions are the same in structure as those of the other units 11 and 12 and are not therefore shown in FIG. 3. With the plurality of the sheet feed units 11, . . . attached, as shown in FIG. 3, the sheet size detection sensor 113 disposed to the sheet feed unit 11 and a sheet size detection sensor 123 disposed to the sheet feed unit 12 are connected at their one ends in parallel with the main printer section 10 via the communications line SIZE1. In a similar manner, the sensors 114, 115 and 116 mounted on the sheet feed unit 11 are connected in parallel respectively with sensors 124, 125 and 126 which are mounted on the sheet feed unit 12.

The other ends of the sensors are connected with each other inside the respective units, and further respectively with collectors of transistors 103a and 103b which are disposed inside the transistor array 103. Hence, when the CPU 101 makes the port SEL1 switch to the H level for instance to thereby turn on the transistor 103a which is connected with this port and activate the selective control line SEL1, a current path is established which runs from the +5V power source to the pull-up resistors, the signal lines, the sensors 113 through 116 and the transistor 103a. Therefore, when some of the sensors 113 through 116 have closed contacts, the input ports of the CPU 101 corresponding to these sensors switch to the L level. On the contrary, the input ports of the CPU 101 corresponding to those sensors among the sensors 113 through 116 whose contacts are open switch to the H level. In this fashion, the CPU 101 can judge the states of the sensors 113 through 116 on the sheet feed unit 11, i.e., whether there is a sheet P1 in on the sheet feed unit 11 and the size of the sheet. This structure allows instantaneous transmission of multiple pieces of information, such as a plurality of sensor outputs, to the main printer section 10. In addition, it is possible to realize a stable communication, since a danger of a missing signal owing to entry of a noise is insignificant.

Meanwhile, since the communications line SET is connected with the other ends of the respective sensors inside the sheet feed unit 11, as far as the sheet feed unit 11 is correctly attached, the port SET always switches to the L level upon activation of the selective control line SELL by the CPU 101. On the contrary, the port SET changes to the H level when this unit is not attached. And therefore, the CPU 101 can judge whether the sheet feed unit 11 remains attached based on the state of the communications line SET.

In a similar manner, as for the sheet feed unit 12 or 13, too, the state of each sheet feed unit can be judged by activating the selective control line SEL2 or SEL3 which corresponds to the sheet feed unit. In this image forming apparatus P, the CPU 101 appropriately executes processing shown in FIG. 4 and accordingly judges the states of the three sheet feed units one after another, i.e., whether each unit has been attached, whether there is a sheet in the unit and the size of the sheet.

Figure 4:
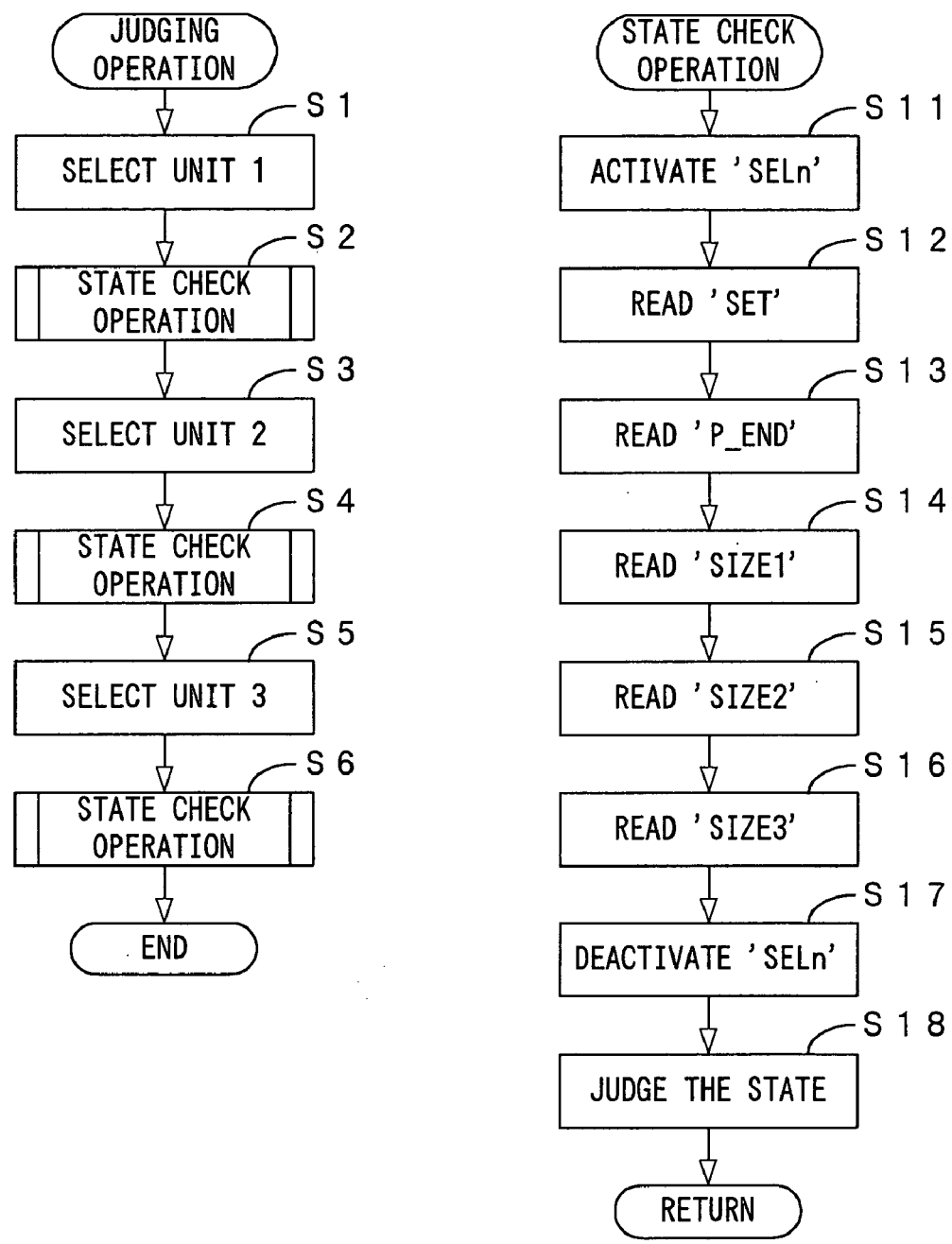
FIG. 4 is a flow chart of a judging operation.

FIG. 4 is a flow chart of a judging operation for judging the state of each sheet feed unit. During this judging operation (the flow on the left-hand side in FIG. 4), first, the unit 1 is selected (Step S1), and in order to judge the state of the unit 1, a state check operation sub-routine is called (Step S2). After thus judging the state of the unit 1, the units 2 and 3 are selected one after another and the state of each unit is judged in a similar fashion (Step S3 through Step S6).

During the state check operation sub-routine (the flow on the right-hand side in FIG. 4), first, the selective control line SELn (n=1, 2, 3) corresponding to the selected unit is activated. For example, when it is the unit 1 that is selected, the port SEL1 of the CPU 101 is changed to the H level and the transistor 103a accordingly turns on. The states (H or L) of the input ports SET, P_END, SIZE1 through SIZE3 are read one after another (Step S12 through Step S16). The selective control line SELn is then returned to the inactive state (Step S17), and the state of the unit is judged from the signal level at each port thus read (Step S18). Although the foregoing requires to read the states of the respective ports one by one, since the signal lines are provided for the respective ports separately from each other, it is possible to shorten the processing time by reading the states of the respective ports at the same time.

Figure 5:
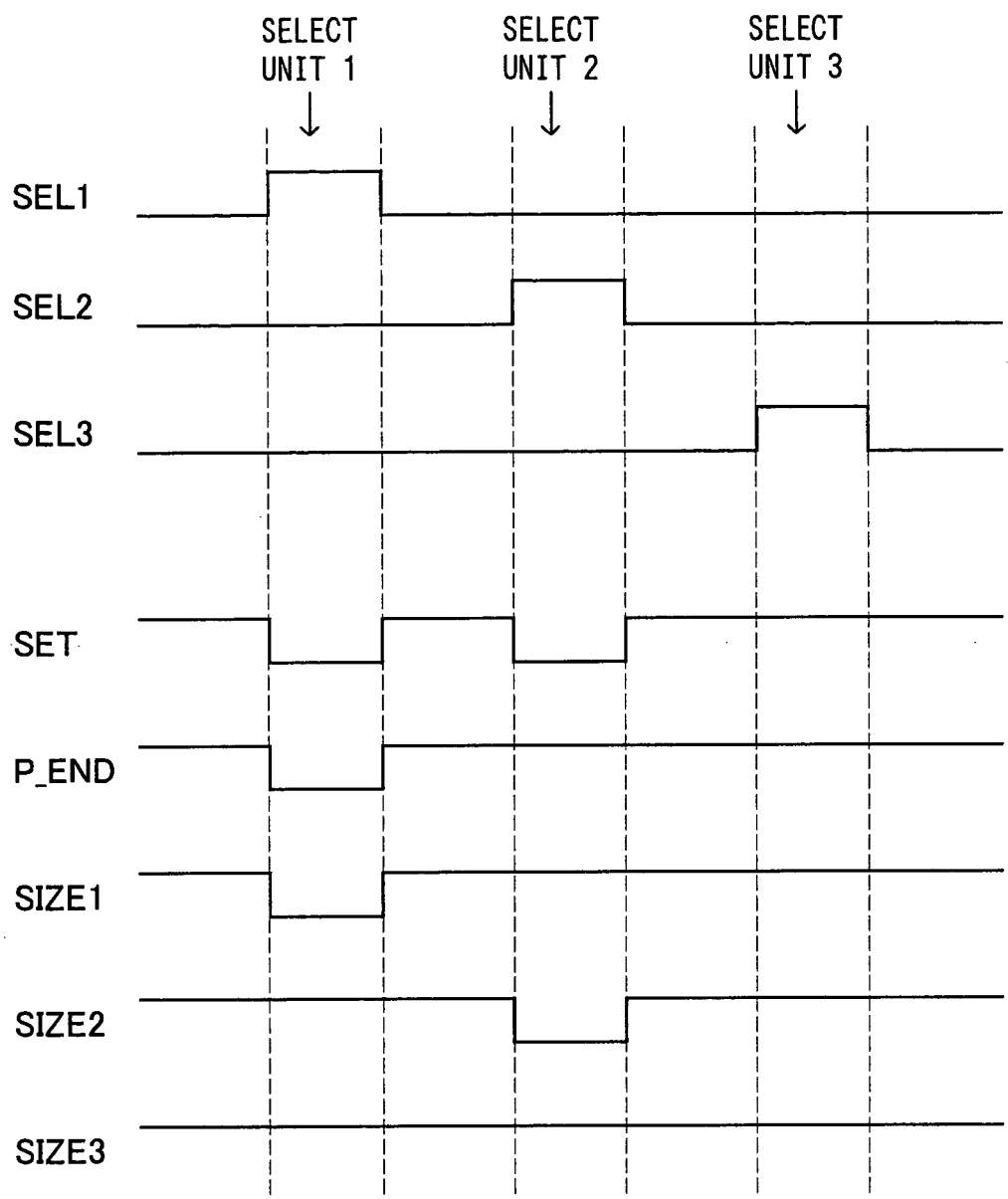
FIG. 5 is a drawing which shows an example of a change of the state of each port during the judging operation.

FIG. 5 is a drawing which shows an example of a change of the state of each port during the judging operation. As the judging operation is performed for each unit as described above, the output level of a selected one of the ports SEL1, SEL2 and SEL3 which correspond to the respective units remains at the H level during a certain period. And during this period, the selective control line which corresponds to the selected unit remains active. In response, the states of the respective input ports change in accordance with the state of the selected unit.

In the example shown in FIG. 5, when the port SELL is at the H level, the signal levels at the ports SET, P_END and SIZE1 change to the L level. This means that the unit 1 has been attached, a sheet has been set and the sheet size corresponds to SIZE1. In a similar manner, when the port SEL2 is switched to the H level, although this means that the unit 2 has been attached and the sheet size is set to the size corresponding to SIZE2 since the ports SET and SIZE2 are at the L level, it is recognized that no sheet has actually been set because the port P_END is still at the H level. Meanwhile, when the port SEL3 is switched to the H level, it is found that the unit 3 has not been attached since every port remains at the H level.

The CPU 101 can thus judge whether each one of the three sheet feed units has been attached, whether there is a sheet and the size of the sheet. Upon receipt of a print instruction from an external apparatus, based on the judgments results on these, the sheet feed unit comprising a sheet which meets the size of an image to be formed is selected and used to form an image. In this case, since the main printer section 10 may select one of the three sheet feed units which holds a necessary sheet based on the judgment results mentioned above, which type of sheet feed unit is at which position does not matter. Hence, for the purpose of control as well, it is possible to freely determine the order of attaching the sheet feed units.

As described above, in this embodiment, of the communications lines from the main printer section 10, the signal lines connect the sensors disposed to the respective units with each other in a parallel connection as viewed from the main printer section 10. That is, since the units are multiplexed in such a manner that the units share the signal lines, it is possible to largely reduce the number of the communications lines and accordingly cut down a cost as compared with a method which requires to connect the sheet feed units 11, . . . with the main printer section 10 separately.

Meanwhile, the selective control lines for selecting one of the units which is to be communicated with are disposed separately in correspondence with the number of units which can be connected, and therefore, it is possible to control the units individually without fail. To be more specific, a current path is established by activating the selective control line which corresponds to one unit, and sensor outputs from the selected unit are transmitted to the CPU 101 of the main printer section 10. Hence, unlike the conventional techniques according to which a main section of apparatus and units communicate with each other by a serial communication, it is not necessary to use a facility which controls communications with the units or adds IDs to the units, the structures of the respective units are thus simple, and a cost can be further reduced. In addition, since decoding/encoding of serial data is unnecessary, it is possible to realize a communication at a higher speed, and since the resistance against noises is high, it is possible to communicate stably.

Further, since each sheet feed unit comprises two connectors for connection with the upstream-side unit with the downstream-side unit and these connectors are structured such that the connectors can be connected with each other, it is possible to connect the respective units in any desired order. Still further, it is possible to correctly operate the units independently of each other however the units are connected with each other, since the internal wirings are laid in each unit such that the control line to each unit from the main printer section 10 reaches the unit through the same contact position located in the upstream-side connector whichever position the unit is located in the sequence of the units. This permits that these units have exactly the same circuit structure, and eliminates the necessity to distinguish the units from each other, thereby further reducing the cost because of standardization of the units. Users can enjoy an advantage that the degree of freedom in combining the sheet feed units is high and it is not necessary to care about the order of the units at the time of attaching the units.

The present invention is not limited to the preferred embodiment described above, but may be modified in various manners in addition to the preferred embodiment described above, to the extent not deviating from the object of the invention. For instance, although it is possible to attach up to three sheet feed units and use two different types of sheet feed units which have different sheet capacities according to the preferred embodiment described above, this is not limiting. A different number (the cascade connection count) of the sheet feed units and the sheet feed unit types may be used. In the event that the number of the sheet feed units is to be further increased, only the necessary number of the selective control lines and the clutch control lines may be added, and it is not necessary to add the signal lines. It is thus possible to minimize an increase of the number of the communications lines owing to an increase of the number of the units.

Further, while the preferred embodiment described above requires that the driver transistor 118 which controls the electromagnetic clutch 117b which drives the sheet feed roller is disposed in each sheet feed unit, the driver transistor 118 may be disposed to the main printer section 10 in which case each sheet feed unit can be formed only by a passive element. In addition, unless needed on the sheet feed units, the power source line serving as a communications line may be omitted, thereby reducing the number of the connector pins.

Further, major portions of each sheet feed unit (the portions enclosed by the dotted line in FIG. 2, for instance) may be mounted on a printed circuit board, and the printed circuit board, the upstream-side connector 111 and the downstream-side connector 112 may be connected by straight-joint harnesses.

Figure 6:
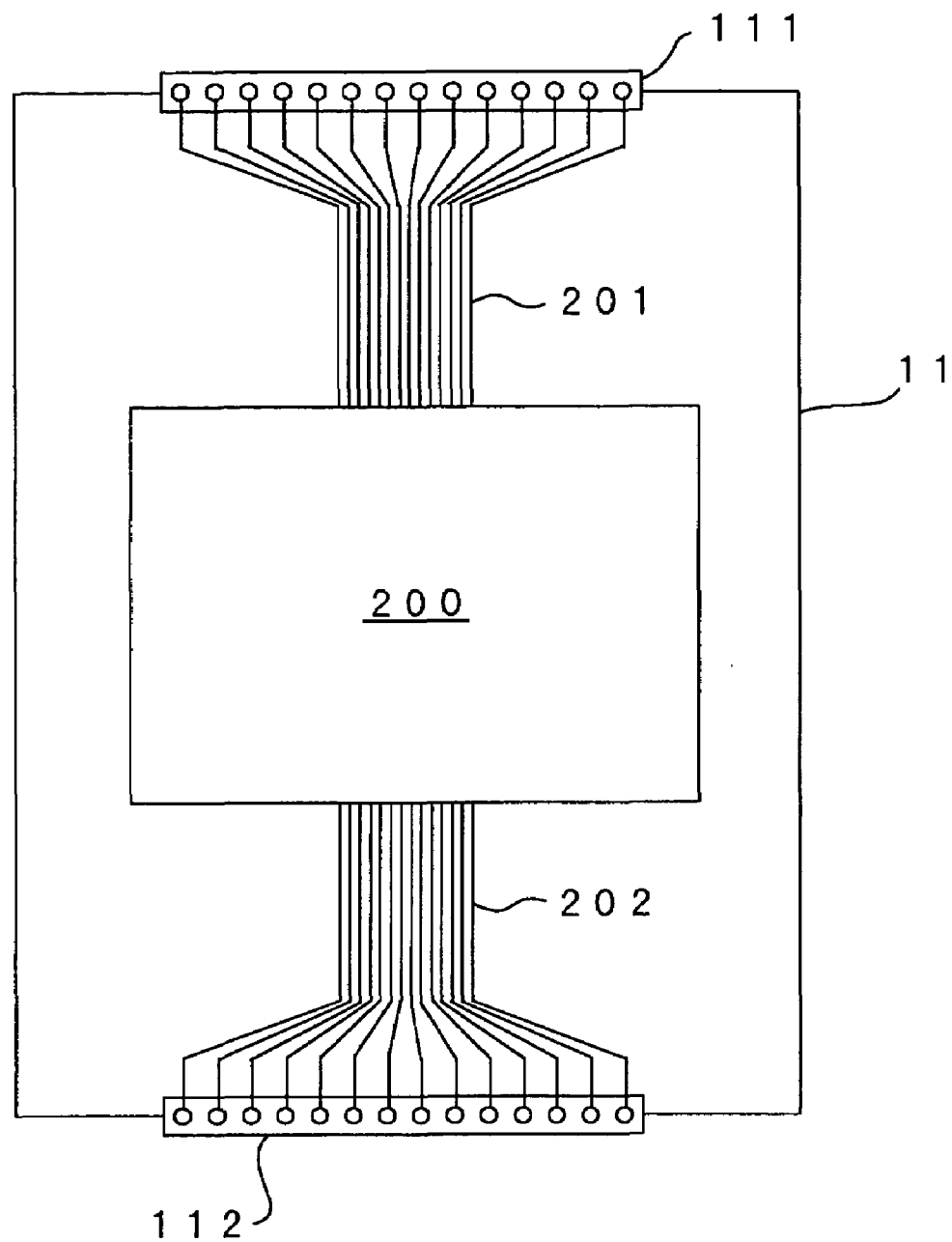
FIG. 6 is a drawing of an example of internal wiring in the sheet feed unit.

FIG. 6 is a drawing of an example of internal wiring in the sheet feed unit. In the example shown in FIG. 6, the circuit board 200 on which the portions enclosed by the dotted line in FIG. 2 are mounted is deposed to the unit 11. While a harness 201 connects the circuit board 200 to the connector 111, a harness 202 connects the circuit board 200 to the connector 112. The harnesses may have the same structure. In addition, since these are straight-joint harnesses, the harnesses can be manufactured using an automatic processing machine, which permits low-cost production. In this case, the printed circuit board 200 mentioned above corresponds to a "relay substrate" of the present invention.

Further, the preferred embodiment described above requires that the image forming apparatus P selects a sheet size which meets the size of an image which is to be formed based on a print instruction fed from a host computer which serves as an external apparatus. Although, information in each sheet feed unit may be sent from the apparatus P to the host computer and the host computer may designate, by means of a print instruction, a sheet size based on thus provided information.

Further, although the preferred embodiment described above is directed to an application of the present invention to an image forming apparatus comprising a plurality of sheet feed units which serve as attachment units, instead of this or besides this, the present invention may be applied to an image forming apparatus to which other attachment units, such as multi-bin units and finisher units, can be attached. In this case, the present invention may be applied to connections between these units having these functions or to each group of units having equivalent functions. It is possible to favorably apply the present invention at least to a plurality of units which have the same function.

Further, although the main printer section 10 and the sheet feed units 11, 12 and 13 are electrically connected with each other as the connectors disposed to these elements engage with each other according to the preferred embodiment described above, this is not limiting. For instance, at least some of these may be connected with each other by a cable.

Further, although the preferred embodiment described above is directed to an application of the present invention to an image forming apparatus which functions as a printer which forms an image in accordance with a print instruction from an external apparatus, applications of the present invention are not limited to this. It is needless to mention that the present invention is applicable also to a copier machine, a facsimile machine and further a multifunction machine which are equipped with these functions.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus, comprising:
   a main section which includes a main-section connector;
   a plurality of attachment units which are attached to said main section in a cascade arrangement, and each of which includes a controlled element; and
   a line group which connects said main section with said plurality of attachment units, and which establishes communications between said main section and said controlled elements which are respectively disposed to said plurality of attachment units, wherein
   said line group includes signal lines and selective control lines,
   said signal lines connect said controlled elements in parallel with said main section, to thereby realize a communication between each one of said controlled elements and said main section,
   said selective control lines connect said main section respectively with said attachment units, to thereby select one of said attachment units to which said main section is to communicate,
   said plurality of attachment units at least includes a first attachment unit which is attached to said main section and a second attachment unit which is attached to said first attachment unit, said first attachment unit having a first controlled element, a first upstream-side connector and a first downstream-side connector, said second attachment unit having a second controlled element, a second upstream-side connector and a second downstream-side connector,
   a contact arrangement of said main-section connector is identical to that of said first downstream-side connector and that of said second downstream-side connector,
   a contact arrangement of said first upstream-side connector is identical to that of said second upstream-side connector,
   the contact arrangement of said main-section connector corresponds to that of said first upstream-side connector, thereby enabling said main-section connector to connect to said first upstream-side connector and to said second upstream-side connector, and also enabling said first downstream-side connector to connect to said second upstream-side connector,
   said line group is electrically connected between said first attachment unit and said main section when said first upstream-side connector is connected to said main-section connector,
   said line group is electrically connected between said second attachment unit and said first attachment unit when said second upstream-side connector is connected to said first downstream-side connector,
   said main-section connector includes a first lower-contact point and a second lower-contact point, the first lower-contact point being wired to said selective control line for the first controlled element, the second lower-contact point being wired to said selective control line for the second controlled element,
   said first upstream-side connector includes a first upper-contact point and a second upper-contact point, the first upper-contact point corresponding to the first lower-contact point and being wired to the first controlled element,
   said first downstream-side connector includes a third lower-contact point,
   said second upstream-side connector includes a third upper-contact point which corresponds to the third lower-contact point and which is wired to the second controlled element, and
   internal wiring in said first attachment unit between the second upper-contact point and the third lower-contact point is shifted so that a position of the first upper-contact point in said first upstream-side connector is identical to a position of the third upper-contact point in said second upstream-side connector.

2. The image forming apparatus of claim 1, wherein said selective control lines are provided in accordance with a cascade connection count of said attachment units relative to said main section, the cascade connection count being the maximum number of said attachment units which can be controlled separately from said main section.

3. The image forming apparatus of claim 1, wherein
   said second upstream-side connector further includes a fourth upper-contact point of which the position is identical to the second upper-contact point in said first upstream-side connector,
   said second downstream-side connector further includes a fourth lower-contact point, and
   internal wiring in said second attachment unit between the fourth upper-contact point and the fourth lower-contact point is shifted so that a position of the fourth lower-contact point in said second downstream-side connector is identical to a position of the third lower-contact point in said first downstream-side connector.

4. The image forming apparatus of claim 1, wherein said plurality of attachment units have the same function with each other.

5. The image forming apparatus of claim 4, wherein said plurality of attachment units have the same structure with each other.

6. The image forming apparatus of claim 1, wherein
   each one of said attachment units comprises a printed circuit board as a relay substrate on which an electric circuit is mounted, and
   said electric circuit includes said controlled element, is connected to said upstream-side connector with a group of straight cables, and is connected to said down-stream side connector with another group of straight cables.

* * * * *